United States Patent
Nielsen et al.

(10) Patent No.: US 7,908,801 B2
(45) Date of Patent: Mar. 22, 2011

(54) MATERIAL AND METHOD FOR PROVIDING INSULATION AND DRAINAGE TO A FOUNDATION WALL

(76) Inventors: Steven F. Nielsen, Charlotte, NC (US); Allan Marcus Dellinger, Weddington, NC (US); Lindsay Castles, Indian Trail, NC (US); Bryan Thomas, York, SC (US)

( * ) Notice: Subject to any disclaimer, the term of this patent is extended or adjusted under 35 U.S.C. 154(b) by 51 days.

(21) Appl. No.: 12/357,813

(22) Filed: Jan. 22, 2009

(65) Prior Publication Data
US 2009/0183446 A1 Jul. 23, 2009

Related U.S. Application Data

(60) Provisional application No. 61/022,617, filed on Jan. 22, 2008.

(51) Int. Cl.
*E02D 19/00* (2006.01)
*E02D 31/00* (2006.01)

(52) U.S. Cl. .................. 52/169.5; 52/169.1; 52/169.11; 52/169.14; 405/36; 405/45

(58) Field of Classification Search ................. 52/169.1, 52/169.2, 169.3, 169.4, 169.9, 169.11, 169.14, 52/302.3, 169.5, 302.6, 302.7; 405/43, 45, 405/36, 52, 303, 46–50, 229
See application file for complete search history.

(56) References Cited

U.S. PATENT DOCUMENTS

| | | | |
|---|---|---|---|
| 3,888,087 A | 6/1975 | Bergsland | |
| 4,142,344 A | 3/1979 | Palmaer | |
| 4,309,855 A | 1/1982 | Pate et al. | |
| 4,318,258 A | 3/1982 | Heck | |
| 4,409,766 A | 10/1983 | Blackmore | |
| 4,704,048 A | 11/1987 | Ahlgrimm | |
| 4,840,515 A * | 6/1989 | Freese | 405/45 |
| 4,943,185 A * | 7/1990 | McGuckin et al. | 405/45 |
| 4,956,951 A | 9/1990 | Kannankeril | |
| 5,056,281 A | 10/1991 | McCarthy | |
| 5,511,346 A | 4/1996 | Kenworthy | |
| 5,615,525 A | 4/1997 | Kenworthy | |
| 5,692,348 A * | 12/1997 | Ambrosino | 52/169.5 |
| 5,704,172 A | 1/1998 | Gougeon et al. | |
| 6,241,421 B1 | 6/2001 | Harvie et al. | |
| 6,672,016 B2 | 1/2004 | Janesky | |
| 6,684,579 B2 * | 2/2004 | Brunson et al. | 52/169.5 |
| 6,802,668 B2 * | 10/2004 | Parker | 405/49 |
| 7,487,624 B2 * | 2/2009 | Baba | 52/783.19 |
| 2006/0000155 A1 | 1/2006 | Wagner | |

(Continued)

OTHER PUBLICATIONS

Perimate Specification Sheet., "Datasheet (online). Retrieved from internet: http://www.drydogbarriers.com/secsheets/Perimate_080207.pdf," DryDog Barriers, (Feb. 8, 2007).

(Continued)

*Primary Examiner* — Jeanette Chapman
(74) *Attorney, Agent, or Firm* — Hammer & Associates, P.C.

(57) ABSTRACT

A material and method for insulating and providing a drainage path for a foundation wall includes a non-woven thermoplastic board being for insulating and providing a drainage path for a foundation wall. The non-woven thermoplastic board has a thermal resistance of an R-value per inch thickness of at least 1. The non-woven thermoplastic board also has a vertical drainage ability per inch thickness of at least 135 Gallons/Hour/Lineal-Foot/inch at a pressure of 500 pounds per square foot (psf).

5 Claims, 9 Drawing Sheets

U.S. PATENT DOCUMENTS

2007/0244209 A1   10/2007   Strandburg et al.
2008/0240860 A1*  10/2008   Ianniello .................. 405/53

OTHER PUBLICATIONS

Hydrotech's Thermaflo(TM), "-Protection, Drainage & Insulation Specification sheet. Datasheet online. Internet: http://web.archive.org/web/20070823043700/http://www/hydrotechusa.com/Thermaflo.htm," Hydrotech, 2007.

Thermaldrain Specification Sheet., "Datasheet (online). DryDog Barriers, retrieved from the internet: http://allstarwalls.com/Dry%20Dog/ThermalDrain%20Flyer.pdf.," (Jan. 17, 2008).

INDA, "Nonwoven Fabric", INDA Nonwovens Glossary, INDA, Association of the Nonwovens Fabrics Industry (Cary, NC, USA), (p. 40), (2002).

Celanese Acetate, "Complete Textile Glossary," "Nonwoven Fabric", Celanese Acetate LLC (New York, NY), (2001).

Unknown, "Classification Definitions," Class 442, Fabric (Woven, Knitted, or Nonwoven Textile or Cloth, etc.), 2002 ed., Unknown, (p. 442-1&27), (2002).

* cited by examiner

MATERIAL AND METHOD FOR PROVIDING INSULATION AND DRAINAGE TO A FOUNDATION WALL

RELATED APPLICATION

This application claims the benefit of U.S. Provisional application Ser. No. 61/022,617 filed Jan. 22, 2008.

FIELD OF INVENTION

The instant application relates to a material and method for providing insulation and drainage to a foundation wall.

BACKGROUND OF THE INVENTION

There is commonly known two types of foundations, shallow foundations and deep foundations. Shallow foundations are usually embedded a meter or so into soil. One common type is the spread footing which consists of strips or pads of concrete (or other materials) which extend below the frost line and transfer the weight from walls and columns to the soil or bedrock. Another common type of shallow foundation is the slab-on-grade foundation where the weight of the building is transferred to the soil through a concrete slab placed at the surface. Deep foundations are used to transfer a load from a structure through an upper weak layer of soil to a stronger deeper layer of soil. There are different types of deep foundations including helical piles, impact driven piles, drilled shafts, caissons, piers, and earth stabilized columns. The naming conventions for different types of foundations vary between different engineers. Historically, piles were wood, later steel, reinforced concrete, pre-tensioned concrete, and/or concrete masonry units.

Insulating the foundation building structures, like residential homes and commercial buildings, is important for many reasons. Insulation for a building's foundation wall can control the heat exchange between the ground and the interior of the foundation wall, thus saving energy. Insulation can also provide a hydrostatic pressure barrier between the surrounding earth and the foundation wall, thus providing structural advantages. Also, protecting the foundation wall from water saturation is important, especially below grade, or below ground, where dampness and moisture is present year round. Thus, a material for insulating and providing an adequate drainage path for a building's foundation wall is desired.

One known product that may be used for insulating and providing a drainage path for a foundation wall is the use of fiberglass boards. The fiberglass boards are applied against the foundation wall after a waterproof coating has been applied. The fiberglass boards can provide a thermal resistance for insulating the foundation, they can provide drainage paths to prevent dampness and moisture from rotting the structure, and they can provide a compression resistance to relieve the structure from some of the hydrostatic pressure from the surrounding earth. However, all of the aforementioned properties could be improved to provide an insulation and drainage material that provides better thermal resistance, better drainage, and better compression resistance.

In addition to these desired improvements, the fiberglass boards are very dangerous to manually install as the glass from the fiberglass can be very irritating and damaging to the installer's skin. Also, the fiberglass boards are sensitive to sunlight, which means they will degrade with any UV exposure. Thus, the fiberglass boards require the foundation to be immediately back filled when installed. Moreover, the fiberglass boards are of a laminar structure with fibers running in the x and y planes, which does not provide for an ideal drainage path across the boards. Also, the fiberglass boards do not stand up well to the changing hydrostatic pressures when back filled, i.e., the fiberglass board tends to break down or be crushed under the constantly changing pressure from the surrounding earth. Finally, the fiberglass boards are bonded with phenolic and formaldehyde resins, which are well known to be dangerous to the environment.

Another product that may be used for insulating and providing a drainage path for a foundation wall is the use of dimpled plastic sheets. Like the fiberglass boards, the dimpled plastic sheets are applied against the foundation wall. The dimpled plastic sheets can either be applied directly to the foundation wall or be applied after a waterproof membrane. When applied after the waterproofing membrane, the dimples face towards the soil with a filter fabric typically either glued or thermally bonded to the dimple side to keep the drainage area clear of soil particles. However the dimpled plastic sheet provides no thermal resistance. In addition, the dimpled plastic sheets can easily be crushed or damaged on the job site and are more difficult to install. Furthermore, when installing with a waterproof membrane, the membrane must be allowed to cure & dry for 24-36 hours before the dimple drain board can be applied and secured, thus adding extra time and delay to the building process. Another disadvantage to the dimpled plastic sheets is that they need to be secured to the foundation wall by mechanical fasteners, like nails, which have to puncture the waterproofing membrane. Dimpled plastic sheets can also be secured by glues or adhesives, but these glues and adhesives are relatively expensive.

The instant invention is designed to provide an insulation and drainage material for a foundation that address all the problems mentioned above.

SUMMARY OF THE INVENTION

The instant invention includes a material and method for insulating and providing drainage to a foundation wall. A material includes a non-woven thermoplastic board being for insulating and providing a drainage path for a foundation wall. The non-woven thermoplastic board has a thermal resistance of an R-value per inch thickness of at least 1. The non-woven thermoplastic board also has a vertical drainage ability per inch thickness of at least 135 Gallons/Hour/Lineal-Foot/inch at a pressure of 500 pounds per square foot (psf).

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
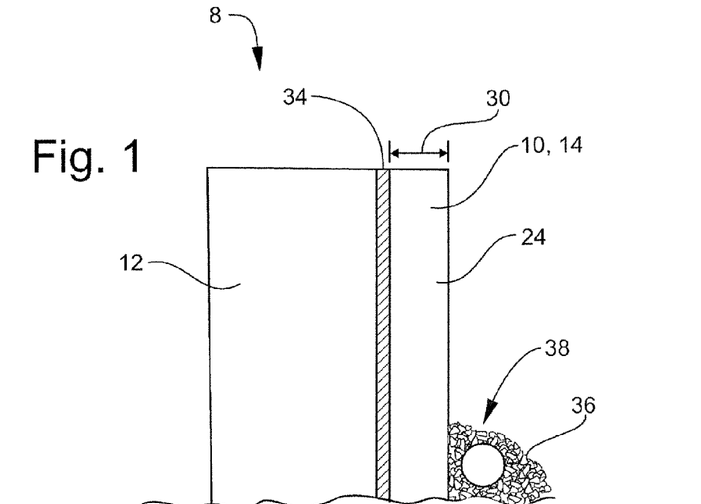
FIG. 1 is a cross-sectional view of one embodiment of a foundation according to the instant invention.

Referring to the drawings, wherein like numerals indicate like elements, there is shown in FIG. 1 an embodiment of an insulation and drainage material 10 for insulating and providing a drainage path for a foundation 8. The material 10 may be used for insulating and providing a drainage path for any structure, including, but not limited to, the foundation of a residential or commercial building. The insulation and drainage material 10 may be used for insulating and providing drainage to any portion of a building's structure, including, but not limited to, walls, roofs, foundations, retaining walls and/or surface drainage. The insulation and drainage material 10 may be a non-woven thermoplastic board 14.

Non-woven thermoplastic board 14 may be used to insulate and provided a drainage path for the foundation 8, as shown in FIGS. 1, and 4-9. Non-woven thermoplastic board 14 may be any non-woven thermoplastic board for insulating and providing a drainage path for foundation 8. In one embodiment, non-woven thermoplastic board 14 may be a polyester board 14. For purposes of discussion, we may refer to non-woven thermoplastic board 14 as non-woven polyester board 14, however, the instant invention is not so limited and may include any other boards with thermoplastics.

Non-woven polyester board 14 may be used to insulate and provided a drainage path for the foundation 8, as shown in FIGS. 1 and 4-9. Non-woven polyester board 14 may be any non-woven polyester board for insulating and providing a drainage path for foundation 8. Non-woven polyester board 14 may be utilized in any way to provide insulation and drainage to foundation 8, including, but not limited to: being applied directly adjacent foundation wall 12 (not shown); being applied to foundation wall 12 after a waterproofing membrane 34 is applied to foundation wall 12 (see FIG. 1); being applied with a dimpled plastic sheet 32 after a waterproofing membrane 34 is applied to foundation wall 12 (see FIG. 4); being applied with dimpled plastic sheet 32 after a waterproofing membrane 34 and a protective board 35 are attached to foundation wall 12 (see FIG. 5); being applied with dimpled plastic sheet 32 directly against foundation wall 12 (see FIG. 6); being applied with dimpled plastic sheet 32 having a filtered fabric 33 applied against waterproofing membrane 34 (see FIG. 7); being applied with dimpled plastic sheet 32 having filtered fabric 33 where material 10 is against waterproofing membrane 34 and the filtered fabric is adjacent the soil or earth (see FIG. 8); and being applied against the dimples of dimpled plastic sheet 32 which is applied against foundation wall 12 with or without waterproof membrane 34 (see FIG. 9). Non-woven polyester board 14 may include any properties, including, but not limited to, a thermal resistance, and a vertical drainage ability.

Figure 2:
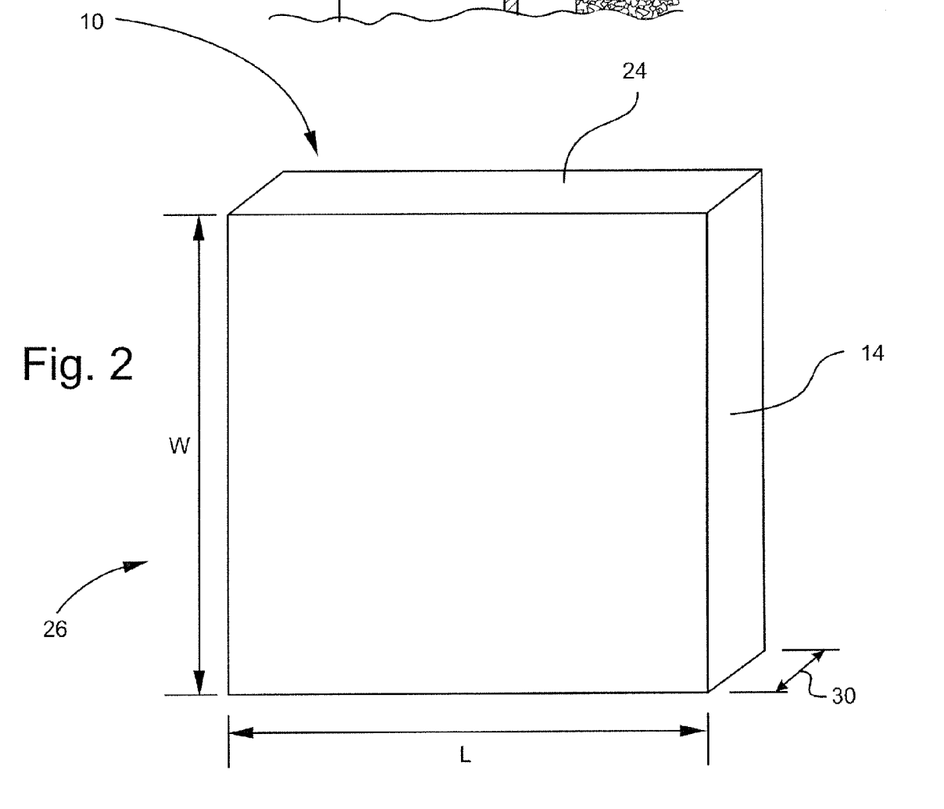
FIG. 2 is a perspective view of the embodiment of the insulation and drainage material shown in FIG. 1 provided in board form with a length (L) and a width (W).
Figure 3:
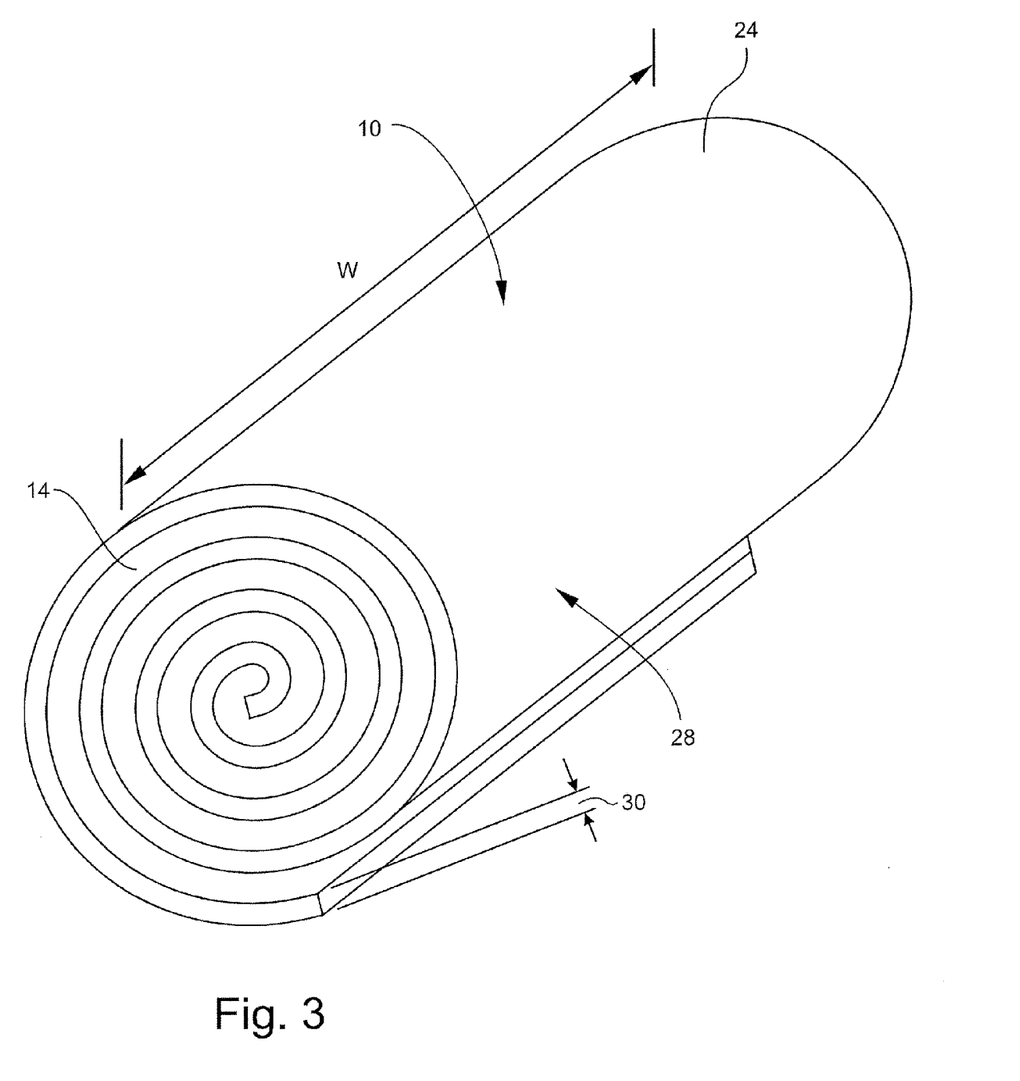
FIG. 3 is a perspective view of the embodiment of the insulation and drainage material shown in FIG. 1 provided in roll form with a width (W).
Figure 10:
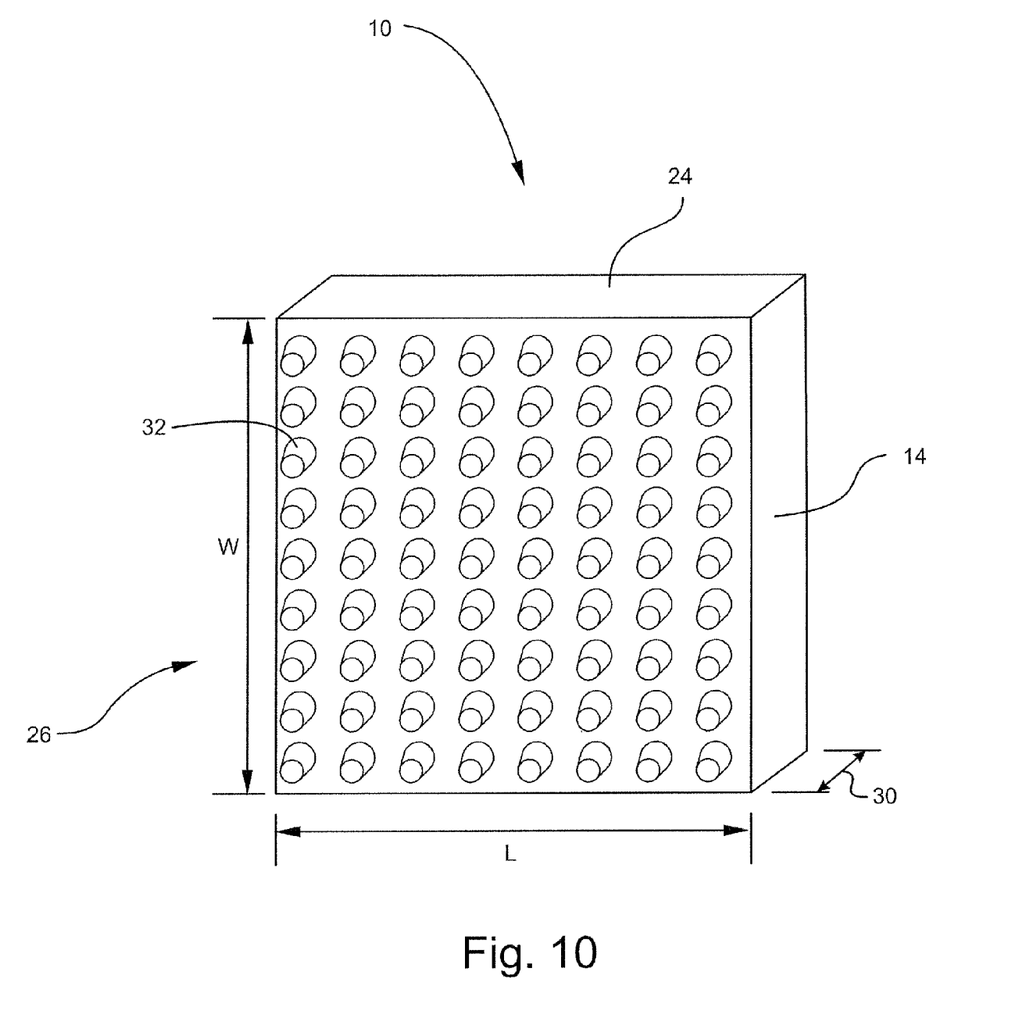
FIG. 10 is a perspective view of the embodiment of the insulation and drainage material shown in FIGS. 4-7 provided in board form with a length (L) and a width (W).
Figure 11:
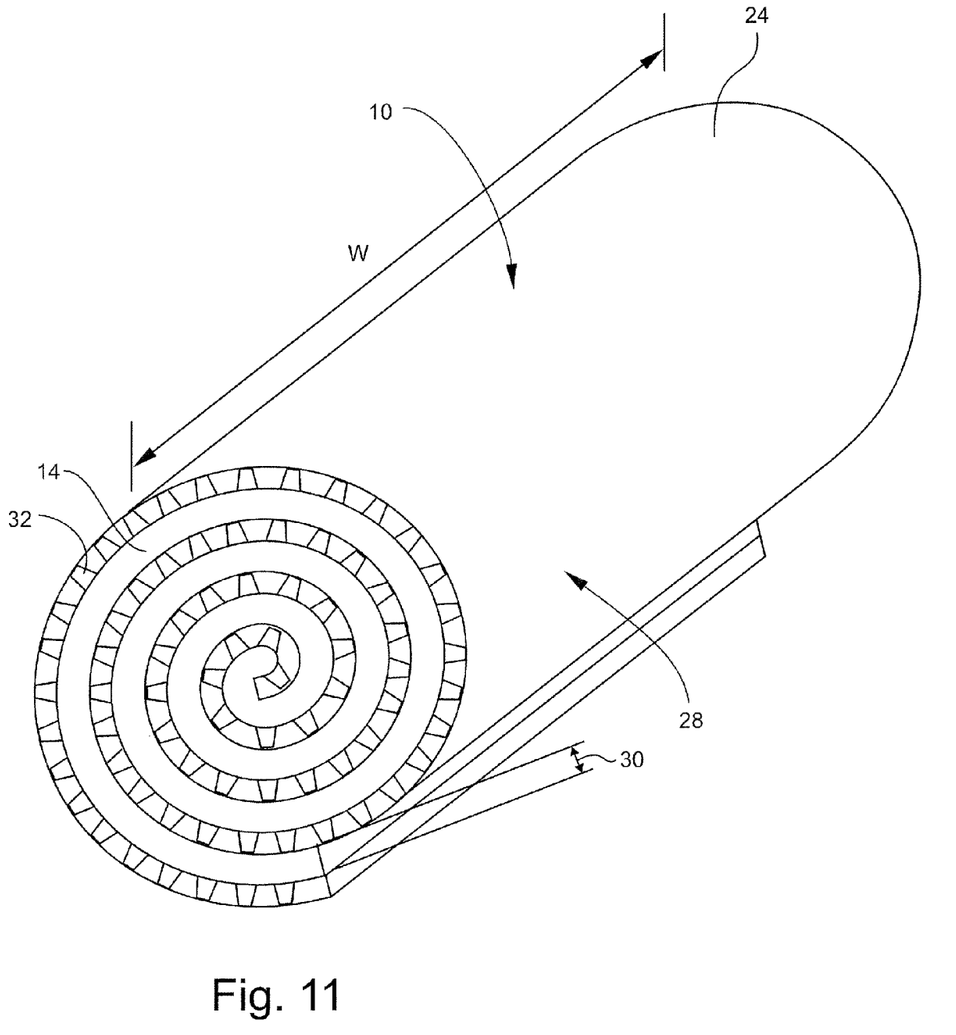
FIG. 11 is a perspective view of the embodiment of the insulation and drainage material shown in FIGS. 4-7 provided in roll form with a width (W).

Non-woven polyester board 14 may be provided in any shape or form. In one embodiment, non-woven polyester board 14 may be provided with a thickness 30. Thickness 30 may be any thickness, including, but not limited to between ¼ an inch and 10 inches. For example, thickness 30 may be ¾ inch, 1 and ⅛ inch, 1 and ³⁄₁₆ inch, 2 and ¼ inch, 2 and ¾ inch, or 2 and ⅜ inch. In another embodiment, non-woven polyester board may be provided in a board form 26 with a length (L) and a width (W). See FIGS. 2 and 10. The board form 26 may include, but is not limited to a 4 foot by 3 foot (4×3) board, a 4 foot by 4 foot (4×4) board, and/or a 4 foot by 8 foot (4×8) board. The board form 26 may allow the material 10 to be treated as plywood for easier and more efficient installation, storage, delivery, etc. In yet another embodiment, non-woven polyester board may be provided in a roll form 28 (see FIGS. 3 and 11). Roll form 28 may include any width, including, but not limited to, a 4 foot wide roll. The roll form 28 may allow the material to be rolled up after manufacturing, and then unrolled at the job site for application. Roll form 28 may allow easier and more efficient installation, storage, deliver, etc. of material 10.

The thermal resistance of material 10 may be for providing the adequate insulation for foundation wall 12 to control the heat exchange between the ground and the interior of the foundation wall, thus saving energy. The thermal resistance of material 10 may be any thermal resistance, including but not limited to, having an R-value of greater than 1 as measured by ASTM Test Number C-518. For example, the thermal resistance of material 10 may be: an R-value of 2.5 for a ⅝ inch thick material 10; an R-value of 3 for a ¾ inch thick material 10; an R-value of 5 for a 1⅜ inch thick material; and an R-value of 10 for a 2¾ inch thick material 10. Thus, the R-value per inch thickness of material 10 may be at least 1. In one embodiment, the R-Value per inch thickness of material 10 may be at least 2. In another embodiment, the R-value per inch thickness of material 10 may be at least 3.

The vertical drainage ability of material 10 may be for providing the adequate vertical drainage for foundation wall 12. Providing adequate drainage to foundation wall 12 may protect foundation wall 12 from water saturation, which is especially important below grade, where dampness and moisture may be present year round. The vertical drainage ability of material 10 may be any drainage ability, including, but not limited to, having a vertical drainage ability of greater than 100 Gallons/Hour/Foot as measured by ASTM Test Number D-4716 at a pressure of 500 pounds per square foot (psf). For example, the vertical drainage ability of material 10 may be: 113 Gallons/Hour/Lineal-Foot for a ⅝ inch thick material at 500 psf; 225 Gallons/Hour/Foot for a 1⅜ inch thick material at 500 psf; and 450 Gallons/Hour/Foot for a 2 and ¾ inch thick material at 500 psf. Thus, in one embodiment of material 10, the vertical drainage ability per inch thickness of material 10 in Gallons/Hour/Lineal-Foot/inch may be at least 135 at 500 psf. In another embodiment of material 10, the vertical drainage ability per inch thickness of material 10 in Gallons/Hour/Lineal-Foot/inch may be at least 160 at 500 psf. In yet another embodiment, the drainage ability per inch thickness of material 10 in Gallons/Hour/Lineal-Foot/inch may be at least 175 at 500 psf. In another example, the vertical drainage ability of material 10 may be 60 Gallons/Hour/Foot for a 1.1 inch thick material at 4000 psf. Thus, in one embodiment of material 10, the vertical drainage ability per inch thickness of material 10 in Gallons/Hour/Lineal-Foot/inch may be at least 30 at 4000 psf. In another embodiment of material 10, the vertical drainage ability per inch thickness of material 10 in Gallons/Hour/Lineal-Foot/inch may be at least 40 at 4000 psf. In yet another embodiment, the drainage ability per inch thickness of material 10 in Gallons/Hour/Lineal-Foot/inch may be at least 50 at 4000 psf.

The set of compression properties of material 10 may be for providing the adequate compression properties to foundation wall 12. These compression properties may provide a hydrostatic pressure barrier between the surrounding earth and the foundation wall, thus providing structural advantages. The set of compression properties of material 10 may be any set of compression properties. The compression properties of material 10 may allow material 10 to have higher vertical drainage ability at greater depths or pressures from the surrounding earth or soil. In addition, the compression properties of material 10 may allow material 10 to continue to have higher vertical drainage ability after many cycles of pressure, for example, from the repeating freezing and thawing of the surrounding earth or soil.

A stiffening resin 24 may be included in one embodiment of insulation and drainage material 10, as shown in FIGS. 1 and 4-9. Stiffening resin 24 may be any material applied to material 10 for stiffening or hardening material 10. For instance, stiffening resin 24 may be a resin, a film (extruded, melt-blown, etc.), a woven facer fabric, a non-woven facer fabric, etc. Stiffening or hardening material 10 may allow the material to be more easily installed as material 10 will act more as a board and won't fold down while trying to be applied to foundation wall 12. It is contemplated that insulation and drainage material 10 may be made to any flexibleness by applying different amounts or types of stiffening resin 24. In one embodiment, insulation and drainage material may be made very stiff (similar to a board) so that material 10 may be easily installed on a flat foundation wall 12. In another embodiment, insulation and drainage material 10 may be very flexible which may allow material 10 to be provided in roll form 28 and installed on a curved foundation wall 12, where material 10 will not crack like fiberglass boards. Stiffening resin 24 may be applied anytime, including, but not limited to, during manufacturing of material 10 or any time thereafter. In one embodiment, as an alternative to stiffening resin 24, or in combination thereof, insulation and drainage material 10 may also be stiffened by hot rolling the outside of material 10. This hot rolling may melt and bind the outside of material 10 to make it stiffer. For instance, if insulation and drainage material 10 is made with bicomponent fibers, hot rolling the outside of material 10 may melt and bind the bicomponent fibers towards the exterior of material 10, thus, making material 10 stiffer.

Non-woven polyester board 14 may be manufactured in any way to create insulation and drainage material 10. The method of making material 10 may further include the step of saturating the polyester board with a stiffening resin 24. The method may also further include the step of cutting the polyester board into a board form 26 or rolling the polyester board into a roll form 28.

Figure 12:
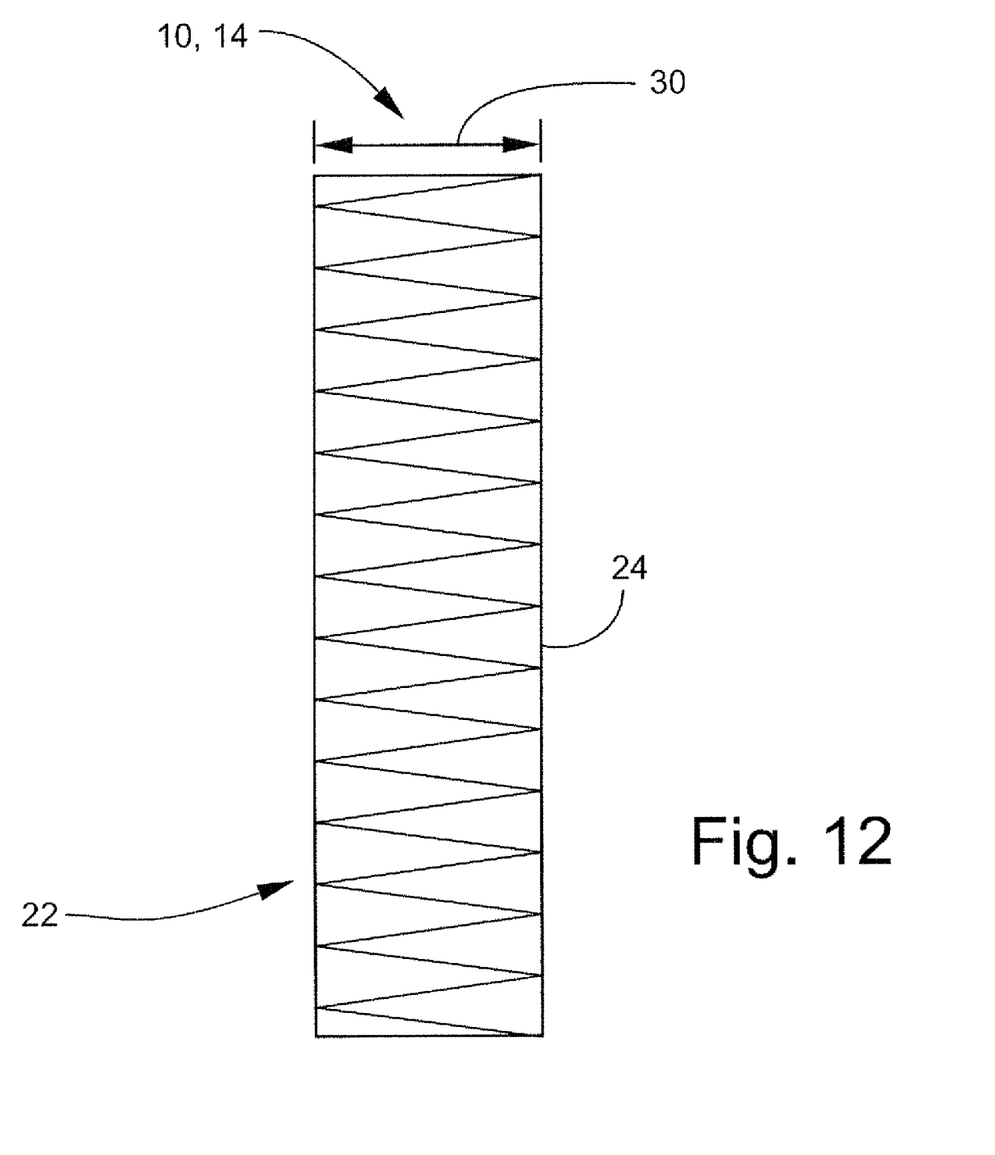
FIG. 12 is a cross-sectional view of one embodiment of the insulation and drainage material manufactured according to the instant invention.

In one embodiment, non-woven polyester board 14 may be manufactured where non-woven polyester board 14 may include an accordion shaped cross-section 22 (see FIG. 12). Manufacturing material 10 with accordion shaped cross-section 22 may provide the vertical drainage ability, set of compression properties, and thermal resistance for material 10. Accordion shaped cross-section 22 may include any length or width accordion shaped cross-section. The method of manufacturing material 10 with the accordion shaped cross-section 22, also known as the vertical lapping Process, may include the steps of: supplying staple fiber to a card(s); carding the web of polyester; and moving the web of polyester into a vertical lapping machine such as the commercial machine knows as Strudo. An insulation and drainage material 10 with an accordion shaped cross-section 22 is available from Structured Fibers Inc. of Satillo, Miss. as a product for use in automobiles as a foam replacement. This material may be modified in any way, for example, by adding stiffening resin 24, in order to provide insulation and drainage material 10.

In another embodiment, non-woven polyester board 14 may be manufactured by a carding and cross lapping process, where the polyester fibers may be carded and cross lapped. In this carded and cross lapping process, non-woven polyester board 14 may be made by carding and cross lapping (90 degrees) a plurality of fibers including a binder (including, but not limited to, low melt fibers, a thermal plastic powder, bicomponent fibers, chemicals and the like), plying the fibers to a certain thickness, and subsequently bonding the fibers and binders together. During the bonding process, the mat can be densified to a predetermined density using compression via equipment to include, but not limited to, a press, calender or double belt process.

In yet another embodiment, non-woven polyester board 14 may be manufactured by a wet lay process. This wet lay process may include the steps of: providing a wet lay web of polyester, which is then pleated, and finally sent into an oven for bonding into an accordion shape to form the non-woven polyester board. This method may provide non-woven polyester board 14 with accordion shaped cross-section 22.

In yet another embodiment, non-woven polyester board 14 may be manufactured by a Spunbond process. This Spunbond process may include the steps of: providing a Spunbond web of polyester, which is then pleated, and finally sent into an oven for bonding into an accordion shape to form the non-woven polyester board 14. This method may provide non-woven polyester board 14 with accordion shaped cross-section 22.

In yet another embodiment, non-woven polyester board 14 may be manufactured by a block process. In this block process, non-woven polyester board 14 may be a fibrous mat structure that may be manufactured by opening and depositing a plurality of fibers, including, binders, into a large rectangular container (box) which can be heated and have pressure applied from the top of the box. The fibers are heated and pressed to the desired density and then cooled. The resulting block can then be skived like a block of foam into sheets of desired thickness representing different thermal insulating values.

In yet another embodiment, non-woven polyester board 14 may be manufactured by an airlay process. This airlay process may include the steps of: taking the fibers through a mechanical opening process, then using a large volume of air, transporting the fibers to a forming head which deposits a uniform layer of fiber on a moving conveyer belt. These open fibers can then be pressed down to a certain thickness for the desired thermal resistance using a machine like a double belt press.

In any embodiment of manufacturing non-woven polyester board 14, non-woven polyester board 14 may be manufactured by a laminate/composite process. In this laminate/composite process, webs made by any nonwoven, woven or knitted process, may be laminated together to form material 10 with specified thermal insulating and drainage values. One particularly useful construction incorporates variable porosity mats designed to minimize blinding of the drainage plane by silt infiltration. Additionally, incorporation of a very open material such as an entangled net product in the interior of the composite construction can channel water very quickly in the drainage plane. Another construction could consist of different materials laminated together, which could include an entangled net product, dimpled plastic sheet 32, and or bentonite panels, laminated to material 10 with the entangled net product and dimple plastic sheet 32 on one side of material 10. In this construction, the entangled net product and dimpled plastic sheet 32 may be positioned next to the foundation wall 12.

Examples

The below table compares the vertical drainage ability and thermal resistance for various thicknesses of the prior art fiberglass boards compared to the non-woven polyester board 14 made according to the instant invention. The non-woven polyester board 14 was made according to the vertical lapping process described above. The vertical drainage ability was measured according to ASTM Test Number D-4716 at a pressure of pounds per square foot (psf). The thermal resistance was measured according to ASTM Test Number C-518.

As can be seen from the above tables, non-woven polyester board 14 may provide a user friendly synthetic thermal resistant board that is a great alternative to fiberglass boards. Non-woven polyester board 14 may provide better drainage than fiberglass and is also much more durable. In addition, non-woven polyester board 14 may be made without the use of phenolic and formaldehyde resins, which makes material 10 environmentally friendly. Non-woven polyester board 14 may also be made out of recycled post consumer and industrial waste, thus providing even more environmental benefits. Furthermore, unlike fiberglass boards, non-woven polyester board 14 will not irritate or harm your skin and may bend easily, which makes it very easy to work with. Finally, non-woven polyester board 14 will not degrade when exposed to UV rays or sunlight, thus, non-woven polyester board 14 can be installed in foundation 8 without needing to be immediately back filled, or it may be stored on a job site without UV protection.

The insulation and drainage material 10 for a foundation wall may be used in the foundation 8 for a building. See FIGS. 1 and 4-9. The foundation 8 for a building may include: a foundation wall 12; a waterproofing membrane 34 applied to the foundation wall 12; and the new insulation and drainage material 10 being adjacent to the waterproofing membrane (see FIG. 1). The foundation may also include a drainage pipe 36 and gravel 38 at the bottom of the foundation wall. The foundation 8 may be insulated and provided with a drainage path via insulation and drainage material 10.

The foundation wall 12 may be included in foundation 8. Foundation wall 12 may be built in any size or shape. Foundation wall 12 may be a flat foundation wall or may be curved. The foundation wall 12 may also be made out of any material, including, but not limited to concrete. Foundation wall 12 may be a shallow or deep foundation wall.

Dimpled plastic sheet 32 may be optionally installed with insulation and drainage material 10 in foundation 8. See FIGS. 4-11. Dimpled plastic sheet 32 may be for providing extra drainage to foundation wall 12. Dimpled plastic sheet 32 may also be for providing extra compression properties for foundation wall 12. Dimpled plastic sheet 32 may be any material for providing extra drainage and/or extra compression properties for foundation wall 12. Dimpled plastic sheet

| MATERIAL | THICKNESS (in) | DRAINAGE ABILITY (Gallons/Hour/Foot) | DRAINAGE ABILITY PER THICKNESS (Gallons/Hour/Lineal-Foot/inch) | THERMAL RESISTANCE ($ft^2 \cdot hr \cdot °F$/Btu) | THERMAL RESISTANCE PER THICKNESS ($ft^2 \cdot hr \cdot °F$/Btu/inch) |
|---|---|---|---|---|---|
| Non-Woven Polyester Board | 5/8 | 113 | 180.8 | 2.5 | 4 |
| Non-Woven Polyester Board | 3/4 | 135 | 180 | 3 | 4 |
| Fiberglass Board | 3/4 | 74 | 98.67 | 3.2 | 4.27 |
| Non-Woven Polyester Board | 1 and 3/8 | 225 | 163.64 | 5 | 3.64 |
| Fiberglass Board | 1 and 3/16 | 118 | 99.37 | 5 | 4.21 |
| Non-Woven Polyester Board | 2 and 3/4 | 450 | 163.64 | 10 | 3.64 |
| Fiberglass Board | 2 and 3/8 | 237 | 99.79 | 10.1 | 4.25 |

The below table shows the thermal resistance of ten different thicknesses of non-woven polyester board 14 made according to the instant invention. The thickness is measured in inches, and the thermal resistances were measured according to ASTM Test Number C-518.

| THICKNESS (in.) | THERMAL RESISTANCE (Btu-in/Hr·$ft^2$·°F.) @ 72° F. | THERMAL RESISTANCE ($ft^2$·hr·°F./Btu) | THERMAL RESISTANCE PER INCH THICKNESS ($ft^2$·hr.·°F./Btu/inch) |
|---|---|---|---|
| 1.09 | 0.3536 | 3.08 | 2.8 |
| 1.09 | 0.2489 | 4.37 | 4.0 |
| 1.17 | 0.2697 | 4.33 | 3.7 |
| 1.23 | 0.2572 | 4.76 | 3.9 |
| 1.24 | 0.2489 | 4.97 | 4.0 |
| 1.26 | 0.2441 | 5.15 | 4.1 |
| 1.27 | 0.2420 | 5.25 | 4.1 |
| 3.50 | 0.3044 | 11.50 | 3.3 |
| 3.30 | 0.4181 | 7.89 | 2.4 |

32 may be integral with insulation and drainage material 10 (see FIGS. 10 and 11) or it may be provided and applied separately. Dimpled plastic sheet 32 may be oriented in any manner, including, but not limited to, being oriented where the dimples are protruding toward wall 12 and away from material 10, where material 10 covers the holes on the back side of dimpled plastic sheet 32. This orientation may prevent the dimples from penetrating material 10. The dimpled plastic sheet 32 may be any type of dimpled plastic sheet, including, but not limited to, a punched and drawn material or an extruded (unto a dimpled calender roll) material. Example dimpled plastic sheets 32 are commercially available from Cosella Dorken of Beamsville, Ontario in Canada, J-Drain of Alpharetta, Ga., and American Wick of Monroe, N.C.

Figure 4:
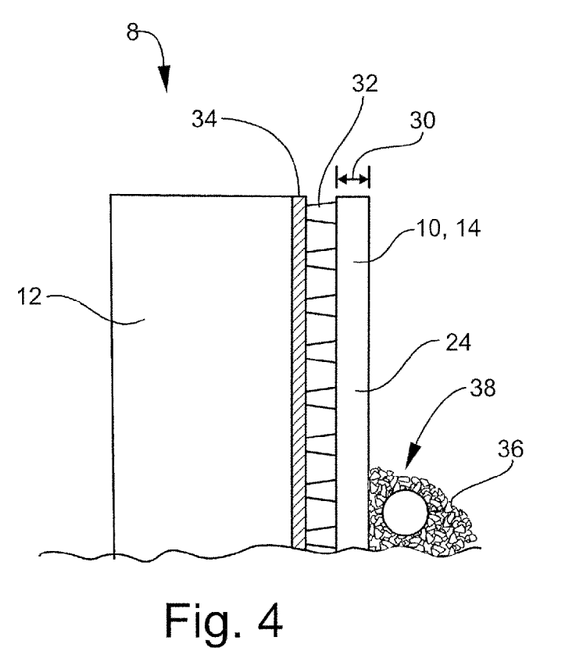
FIG. 4 is a cross-sectional view of another embodiment of a foundation wall according to the instant invention.

In the embodiment shown in FIG. 4, dimpled plastic sheet 32 may be applied between insulation and drainage material 10 and waterproofing membrane 12 adjacent foundation wall 12. In this embodiment, the insulation and drainage material 10 may optionally have the dimpled plastic sheet 32 adhered (via mechanical fasteners or adhesives or thermal bonding) to a surface thereof so that the open cups of the dimpled plastic sheets are closed by the material.

Figure 5:
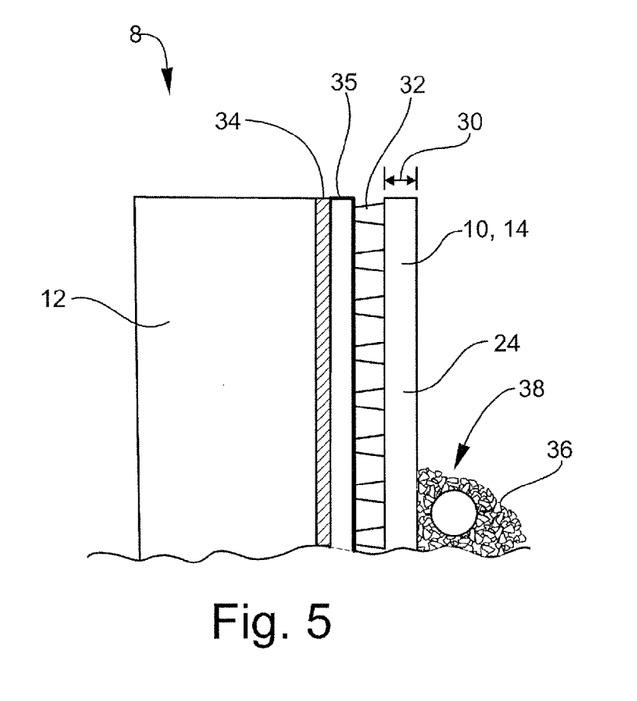
FIG. 5 is a cross-sectional view of another embodiment of a foundation wall according to the instant invention.

In the embodiment shown in FIG. 5, dimpled plastic sheet 32 may be applied between insulation and drainage material 10 and protective board 35 adjacent foundation wall 12. In this embodiment, the insulation and drainage material 10 may optionally have the dimpled plastic sheet 32 adhered (via mechanical fasteners or adhesives or thermal bonding) to a surface thereof so that the open cups of the dimpled plastic sheets are closed by the material. The protective board 35 may prevent the dimples of dimpled plastic sheet 32 from puncturing waterproofing membrane 34.

Figure 6:
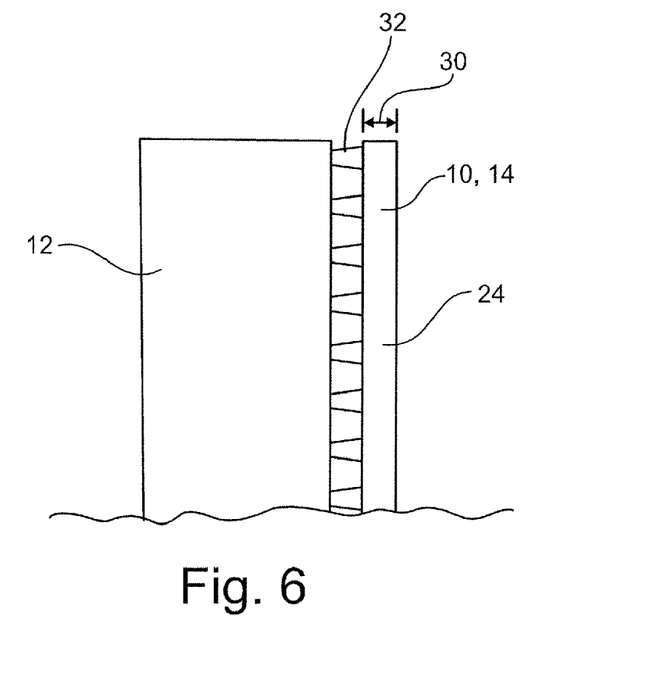
FIG. 6 is a cross-sectional view of another embodiment of a foundation wall according to the instant invention.

In the embodiment shown in FIG. 6, dimpled plastic sheet 32 may be applied between insulation and drainage material 10 and foundation wall 12 with the dimples facing foundation wall 12. In this embodiment, the dimples of dimpled plastic sheet 32 may be directly against foundation wall 12 with no waterproofing membrane. In this embodiment, the insulation and drainage material 10 may optionally have the dimpled plastic sheet 32 adhered (via mechanical fasteners or adhesives or thermal bonding) to a surface thereof so that the open cups of the dimpled plastic sheets are closed by the material.

Figure 7:
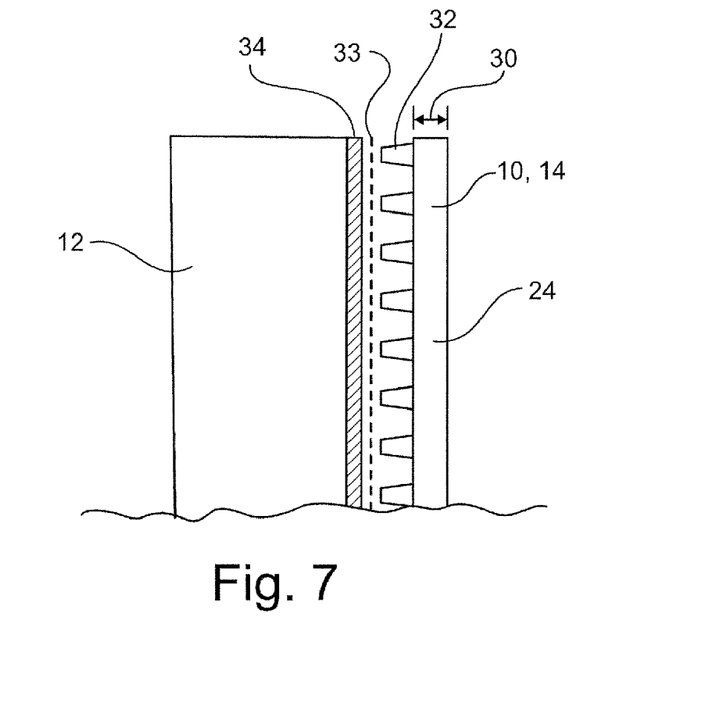
FIG. 7 is a cross-sectional view of another embodiment of a foundation wall according to the instant invention.

In the embodiment shown in FIG. 7, dimpled plastic sheet 32 may be applied with filtered fabric 32 covering the dimples, where dimpled plastic sheet 32 is between insulation and drainage material 10 and waterproofing membrane 12 adjacent foundation wall 12. Filtered fabric 33 may prevent the dimples of dimpled plastic sheet 32 from puncturing waterproofing membrane 34. In this embodiment, the insulation and drainage material 10 may optionally have the dimpled plastic sheet 32 adhered (via mechanical fasteners or adhesives or thermal bonding) to a surface thereof so that the open cups of the dimpled plastic sheets are closed by the material.

Figure 8:
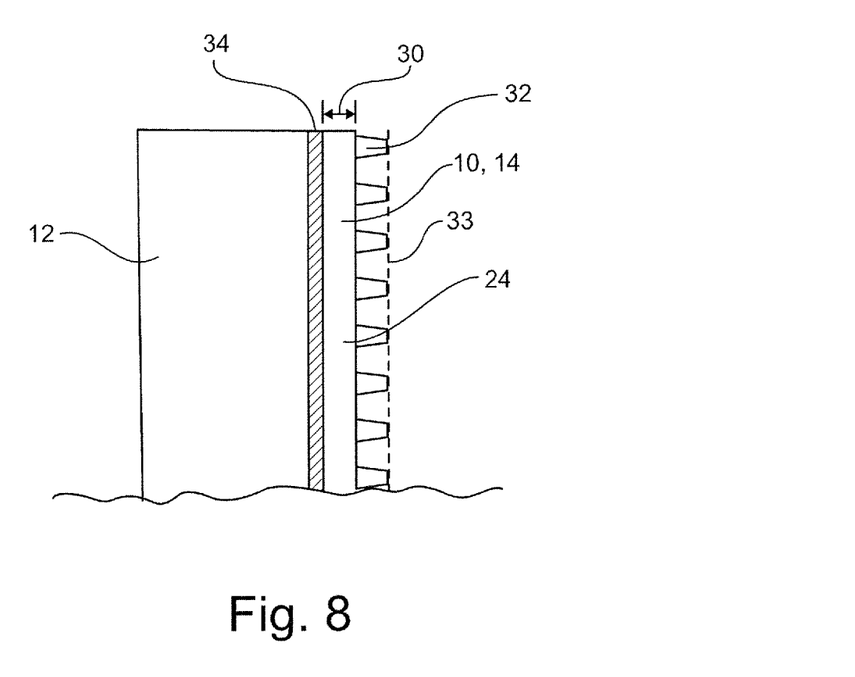
FIG. 8 is a cross-sectional view of another embodiment of a foundation wall according to the instant invention.

In the embodiment shown in FIG. 8, dimpled plastic sheet 32 may be applied with filtered fabric 32 covering the dimples, where dimpled plastic sheet 32 is adjacent insulation and drainage material 10 which is applied against foundation wall with or without waterproofing membrane 12. Filtered fabric 33 may prevent the soil from clogging the drainage path of dimpled plastic sheet 32. In this embodiment, the insulation and drainage material 10 may optionally have the dimpled plastic sheet 32 adhered (via mechanical fasteners or adhesives or thermal bonding) to a surface thereof so that the open cups of the dimpled plastic sheets are closed by the material.

Figure 9:
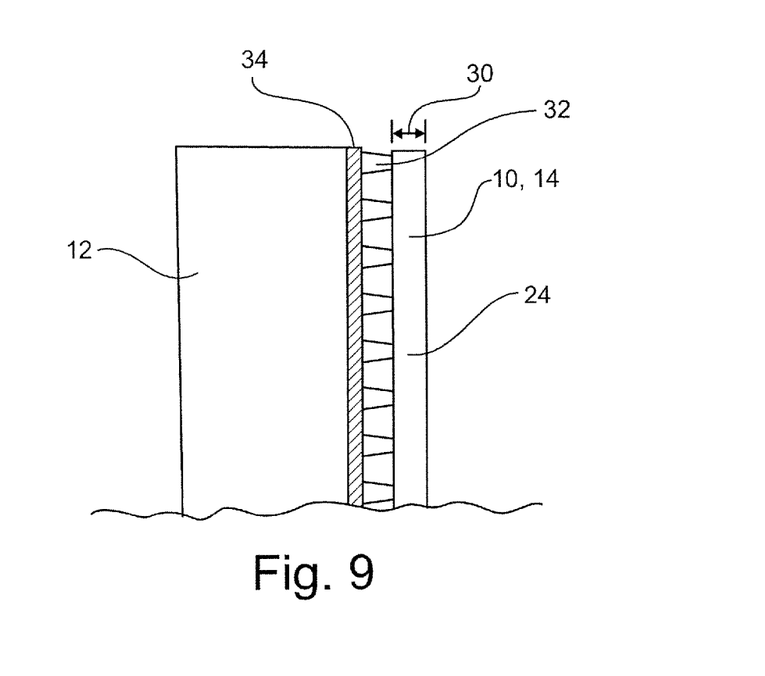
FIG. 9 is a cross-sectional view of another embodiment of a foundation wall according to the instant invention.

In the embodiment shown in FIG. 9, dimpled plastic sheet 32 may be applied with between insulation and drainage material 10 and foundation wall 12, with or without waterproofing membrane 34, where the dimples face towards material 10.

Waterproofing membrane 34 may be optionally included in foundation 8 of the instant invention. See FIGS. 1, 4-5 and 7-9. Waterproofing membrane 34 may be for waterproofing foundation wall 12. Waterproofing membrane 34 may be any known material capable of waterproofing foundation wall 12. Waterproofing membrane 34 may be made of any material, including, but not limited to, an asphalt.

Filtered fabric 33 may optionally be included in foundation 8 of the instant invention. See FIGS. 7 and 8. Filtered fabric 33 may be for preventing soil and the surrounding earth from entering and clogging the drainage path of dimpled plastic sheet 32. Filtered fabric 33 may be secured to the dimples of dimpled plastic sheet 32. Filtered fabric 33 may be any filtered fabric known in the art.

Protective board 35 may be optionally included in foundation 8 of the instant invention. See FIG. 5. Protective board 35 may be for preventing dimpled plastic sheet 32 from penetrating waterproofing membrane 34. Without protective board 35, dimpled plastic sheet 32 may be forced to penetrate waterproofing membrane 34 (making the waterproofing membrane less waterproof), due to the changes in hydrostatic pressure from the surrounding earth. Protective board 35 may be any device capable of preventing dimpled plastic sheet 32 from penetrating waterproof membrane 34. Protective board 35 may be made of any material, including, but not limited to, a foam.

Drainage pipe 36 may be included in foundation 8 of the instant invention. See FIGS. 1, 4 and 5. Drainage pipe 36 may be for any known uses in the art, including, providing a drainage pipe at the bottom of foundation wall 12. Drainage pipe 36 may be any type of drainage pipe known in the art, including, but not limited to, a standard PVC drainage pipe or a strip drain.

Gravel 38 may be included in foundation 8 of the instant invention. See FIGS. 1, 4 and 5. Gravel 38 may be for any known uses in the art, including, preventing drainage pipe 36 from becoming clogged from the surrounding soil. Gravel 38 may be any type of gravel known in the art.

Figure 13:
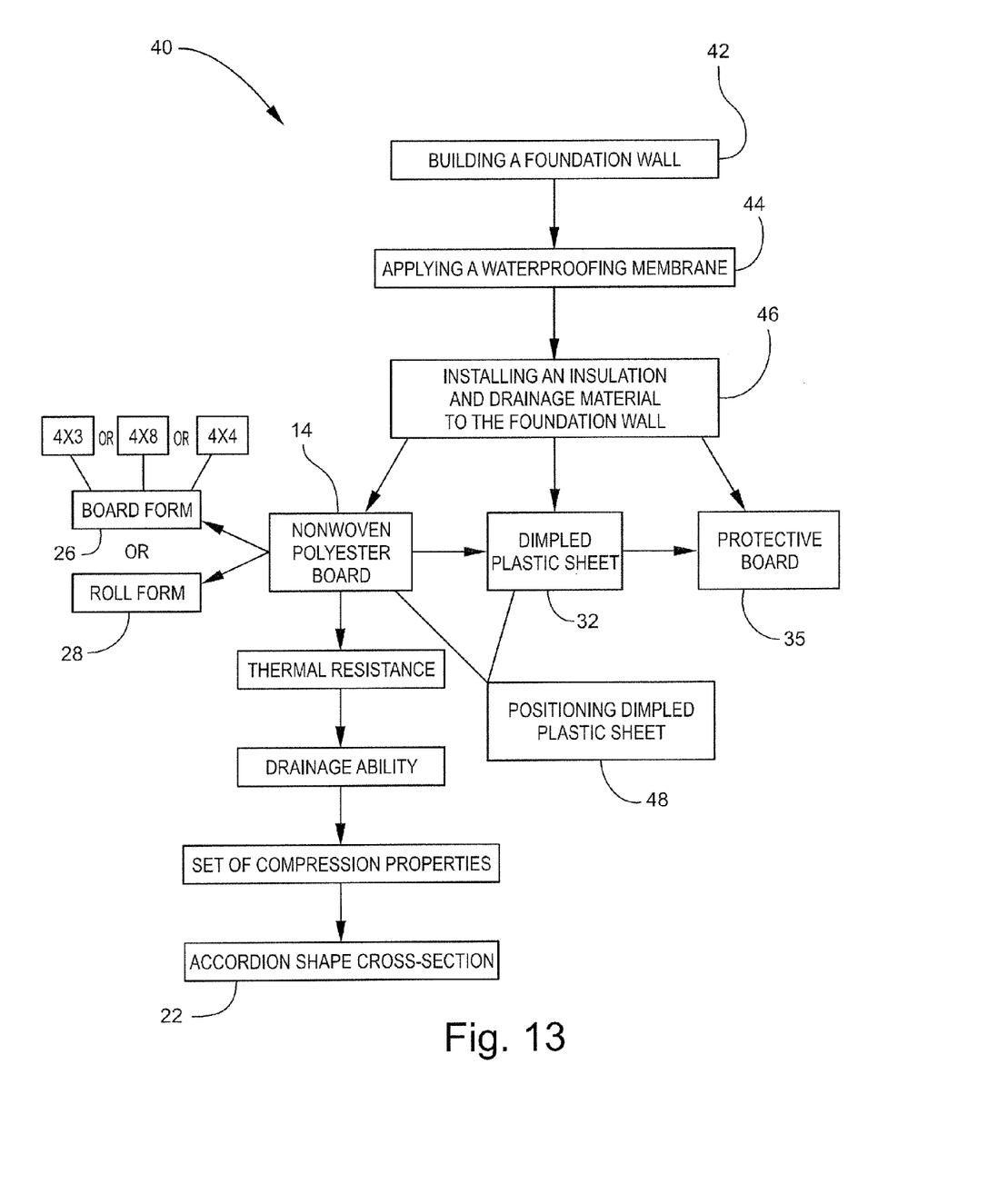
FIG. 13 is a diagram of one embodiment of the method of insulating and providing a drainage path of a foundation wall according to the instant invention.

As shown in FIG. 13, method 40 of the instant invention is for insulating foundation 8 and providing a drainage path for foundation 8. Method 40 may include any steps for insulating foundation 8 and providing a drainage path for foundation 8. In one embodiment, method 40 may include the following steps: a step 42 of building foundation wall 12; a step 44 of applying waterproofing membrane 34 to foundation wall 12; and a step 46 of installing insulation and drainage material 10 approximate to the exterior of foundation wall 12.

Step 42 of building foundation wall 12 may be included in method 40 of insulating foundation 8 and providing a drainage path for foundation 8. See FIG. 13. Step 42 may include any known steps in the art for building foundation wall 12, including, but not limited to, pouring any type of concrete foundation wall.

Step 44 of applying waterproofing membrane 34 to foundation wall 12 may be included in method 40 of insulating foundation 8 and providing a drainage path for foundation 8. See FIG. 13. Step 44 may include any known steps in the art for applying waterproofing membrane 34 to foundation wall 12, including, but not limited to, applying a liquid asphalt waterproofing membrane, or self adhered membrane, onto foundation wall 12.

Step 46 of installing insulation and drainage material 10 adjacent to the exterior of foundation wall 12 may be included in method 40 of insulating foundation 8 and providing a drainage path for foundation 8. See FIG. 13. Step 46 may include any steps for installing material 10 approximate to the exterior of foundation wall 12, including, but not limited to, securing material 10 to the exterior of foundation wall 12 via mechanical fasteners, adhesives or thermal bonding. Step 46 of installing insulation and drainage material 10 approximate to the exterior of foundation wall 12 may be done at any time, including, but not limited to, being done immediately after applying waterproofing membrane 32. This means that insulation and drainage material 10 may be secured adjacent to waterproofing membrane 34 even when waterproofing membrane 34 has not dried or is still wet. Step 46 may include installing material 10 in any form, including, but not limited to, in board form 26 (see FIGS. 2 and 10) or in roll form 28 (see FIGS. 3 and 11). In one embodiment, step 46 may also include a step 48 of attaching dimpled plastic sheet 32 to insulation and drainage material 10 (see FIGS. 4-8).

Step 48 of positioning dimpled plastic sheet 32 next to insulation and drainage material 10 may be included in method 40 of insulating foundation 8 and providing a drainage path for foundation 8. See FIG. 13. Step 48 may include any steps for positioning dimpled plastic sheet 32 next to insulation and drainage material 10, including, but not limited to, attaching dimpled plastic sheet 32 to material 10 via mechanical fasteners, adhesives or thermal bonding. Step 48 may be done at any time, including, but not limited to, during the manufacture of insulation and drainage material 10, while insulation and drainage material 10 is being installed in foundation 8, or anytime there between. In one embodiment, step 48 may include positioning dimpled plastic sheet 32 next to insulation and drainage material 10, where dimpled plastic sheet 32 is adjacent to waterproofing membrane 34. In another embodiment, step 48 may include positioning dimpled plastic sheet 32 next to insulation and drainage material 10, where dimpled plastic sheet is adjacent to protective board 35, which may be adjacent to waterproofing membrane 34. In all of these two embodiments, as shown in FIGS. 4-8, step 48 may include positioning dimpled plastic sheet 34 next to material 10, where the dimples face away from material 10. In the embodiment shown in FIG. 9, step 48 may include positioning dimpled plastic sheet 34 next to material 10, where the dimples face towards material 10.

The instant invention may be embodied in other forms without departing from the spirit and the essential attributes thereof, and, accordingly, reference should be made to the appended claims, rather than to the foregoing specification, as indicated in the scope of the invention.

We claim:

1. A foundation for a building comprising:
   a foundation wall; and
   an insulation and drainage material being adjacent to said foundation wall;
   said insulation and drainage material comprising a non-woven thermoplastic board having a thermal resistance having an R-value per inch thickness of at least 1, and a vertical drainage ability per inch thickness of at least 135 Gallons/Hour/Lineal-Foot/inch at a pressure of 500 pounds per square foot (psf).

2. The foundation for a building of claim 1 further comprising a waterproof membrane applied to said foundation wall.

3. The foundation for a building of claim 1 further comprising a dimpled plastic sheet.

4. The foundation for a building of claim 3 where said dimpled plastic sheet being positioned between said foundation wall and said non-woven thermoplastic board.

5. The foundation for a building of claim 3 where said dimpled plastic sheet being positioned on the outside of said non-woven thermoplastic board.

* * * * *